June 12, 1934.  A. H. BOILEAU  1,962,386
MUTATOR
Filed July 18, 1931    2 Sheets-Sheet 2
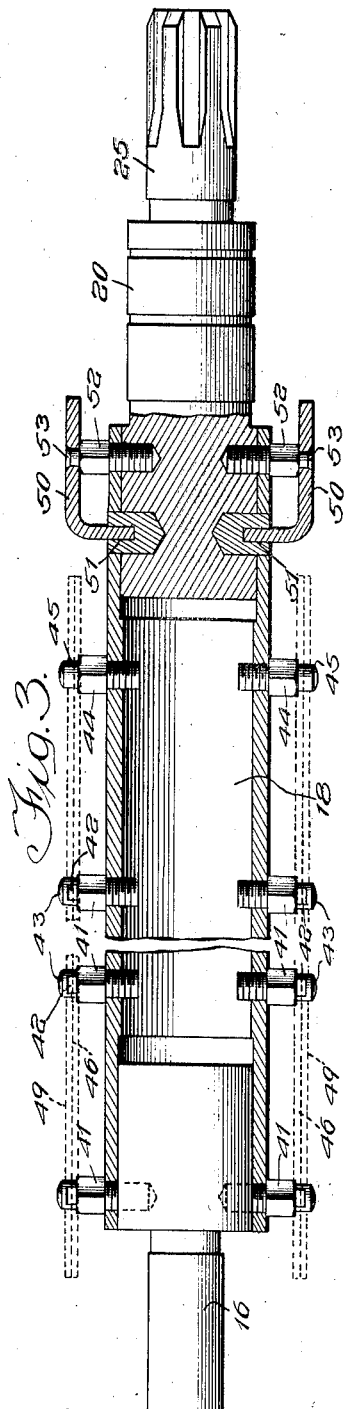
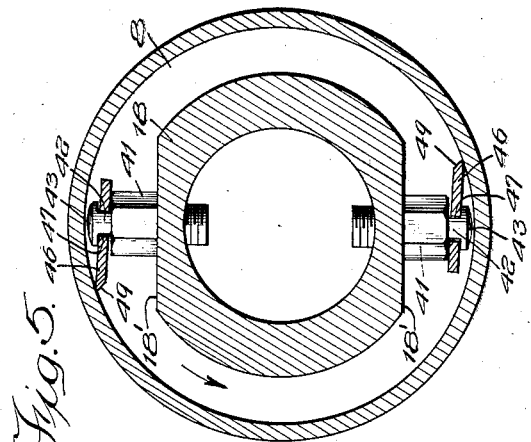
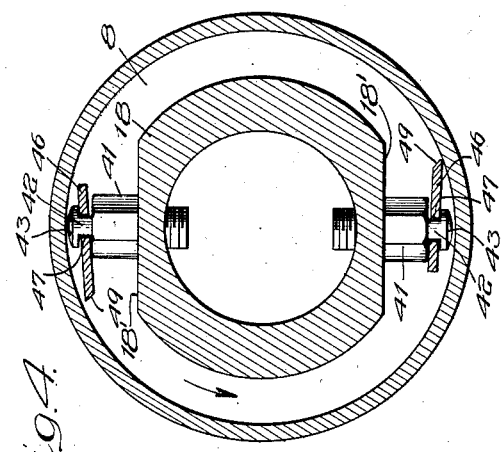
Witness:
William P. Kilroy
Inventor:
Archur H. Boileau
By  Wm. O. Belt
Atty.

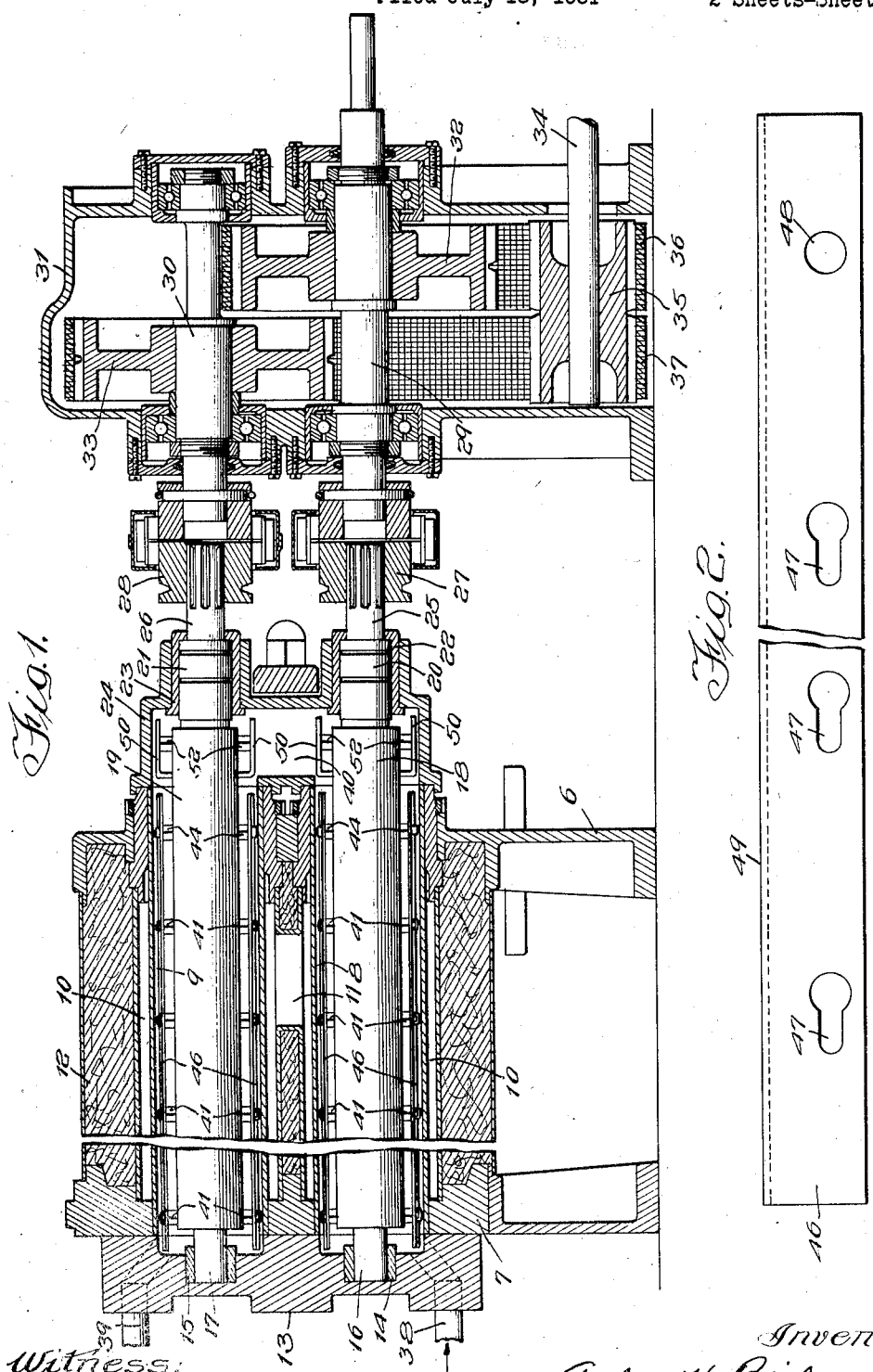

Patented June 12, 1934

1,962,386

UNITED STATES PATENT OFFICE 1,962,386

MUTATOR

Arthur H. Boileau, Cedar Rapids, Iowa, assignor to Cherry-Burrell Corporation, Wilmington, Del., a corporation of Delaware Application July 18, 1931, Serial No. 551,599

7 Claims. (Cl. 259—64)

This invention relates to improvements in ice cream freezers and it has particular reference to the mutator which is also called a dasher or scraper.

One of the objects of the invention is to provide a novel mutator which adapts itself to the shape of the wall of the chamber in which it operates to conform with variations in the contour of said wall due to thermal expansion or contraction thereof or to other causes.

Another object of the invention is to provide a mutator having one or more scraping blades mounted thereon loosely and in a novel manner so that centrifugal force acting on the blade and the pressure of the mixture against the underside of the blade holds the scraping edge of the blade constantly in operative contact with the wall of the chamber in which the mutator operates.

Another object of the invention is to provide means to prevent the mixture from building up and clogging the passageway which connects two chambers through which the mixtures passes successively and to provide the mutators operating in said chambers with agitating means for this purpose.

And a further object of the invention is to provide a mutator which operates freely and without becoming clogged with fruits, nuts, and the like, and which may be easily cleaned.

My invention is adapted for, and may be embodied in, mutators for other devices than ice cream freezers and for operating upon other materials than ice cream mixtures, but I have selected an ice cream freezer to illustrate the invention in the accompanying drawings in which Fig. 1 is a longitudinal sectional view of a freezer embodying my invention and comprising two freezing chambers connected together and a mutator operating in each chamber;

Fig. 2 is a plan view of a mutator blade;

Fig. 3 is an enlarged longitudinal sectional view of one mutator with the blades indicated in broken lines;

Fig. 4 is a transverse sectional view of the mutator showing the blades as they would rest in inoperative position with the chamber empty of mixture; and Fig. 5 is a sectional view similar to Fig. 4 but showing the blades as they appear in operative position in scraping contact with the chamber wall when the chamber is filled with mixture.

Referring to the drawings, 6 is a base supporting a housing 7 which has therein a pair of parallel tubular aerating and freezing chambers 8 and 9 and a surrounding refrigerating chamber 10 which includes a portion 11 between the freezing chambers. The housing includes suitable insulation 12 and any desired means may be employed for maintaining the circulation of a refrigerating medium in the chamber 10, 11. At one end of the housing there is a plate or head 13 having bearings 14, 15 therein to receive the studs 16, 17 on the ends of the mutators 18, 19 which are arranged to operate in the chambers 8 and 9. The mutators are reduced in diameter at 20 and 21, and these reduced portions are journaled in bearing sleeves 22 and 23 which are mounted in the cover plate 24 on the end of the housing opposite the head 13. The shaft sections 25 and 26 beyond the reduced portions 20 and 21 are splined in driving collars 27 and 28 driven by shafts 29 and 30 mounted in the driving housing 31. A sprocket 32 is fast on the shaft 29 and a sprocket 33 is fast on the shaft 30. At the bottom of the housing 31 there is a driving shaft 34 carrying an elongated sprocket 35. An endless chain 36 is driven by the sprocket 35 and drives the sprocket 32, and another endless chain 37 is driven by the sprocket 35 and drives the sprocket 33. When the drive shaft 34 is operated, the chains 36 and 37 transmit power through the sprockets 32 and 33 to the shafts 29 and 30 to rotate the driving collars 27 and 28 which, in turn, rotate the mutators 18 and 19.

An inlet 38 and an outlet 39 in the head 13 connect respectively with the lower chamber 8 and the upper chamber 9, and the material to be operated upon is introduced into the lower chamber through the inlet 38 from any suitable supply and preferably from an aerating means such as disclosed in my co-pending application, Serial No. 556,930, filed August 13, 1931. The chamber 8 is connected with the chamber 9 by a passage 40 and the material operated upon by the lower mutator 18 passes through this passage 40 and through the upper chamber 9 and is discharged through the outlet 39, the pressure applied in introducing the mixture into the lower chamber 8 being sufficient to move the material through the chamber 8, the passage 40, and the chamber 9 into the outlet 39.

The chambers 8 and 9 and the passage 40 are maintained at desired refrigerating temperature by the refrigerating medium circulated in the chamber 10, 11 and notwithstanding the movement of the material from left to right through the lower chamber 8 and upward through the passage 40 and from right to left through the upper chamber 9, Fig. 1, it tends to adhere to the walls of the chambers and passage unless some means is provided to scrape the walls and permit the flow of the material. For this purpose I provide the mutators with scraping blades and agitating means which prevent the material from adhering to the walls of the chambers and from clogging in the passageway and which keep the material constantly in a condition to permit the free flow thereof through the freezer. Each mutator body has oppositely disposed longitudinally extending flattened sections 18' and a plurality of studs project outwardly in spaced relation from these flattened sections. The studs may be screwed into the mutators or otherwise secured. Each stud has a reduced neck 42 and a head 42. At one end of each mutator there are additional studs 44, Fig. 3, having cylindrical outer ends 45 aligned and corresponding with the neck and head of the other studs. The blade 46, Fig. 2, is provided with keyhole openings 47 for the studs 41 and a circular opening 48 for the stud 44. All of these openings are arranged in alignment lengthwise of the blade and they are offset on the opposite side of the longitudinal center line of the blade from the scraping edge 49. To mount a blade in position on the mutator, the round part of the keyhole openings is engaged with the heads 43 of the studs 44 and then the blade is moved lengthwise to engage the elongated parts of the keyhole openings with the necks 42 of the studs 44; and then the openings 48 are engaged with the outer ends of the studs 44 which hold the blade in locked position on the studs 44 with the elongated parts of the keyhole openings engaged with the necks and beneath the heads of the studs 44. The necks 42 of the studs are slightly smaller than the elongated parts of the keyhole openings and they are longer than the thickness of the blade so that while the blade is securely locked on the studs it is loosely retained and is capable of rocking transversely, that is to say, it is capable of movement both radially and tangentially of the rotatable mutator body. Since the openings in the blade are closer to the rear edge than to the scraping edge, the greater part of the width of the blade is located at the front of the studs and the pressure of the material against the underside of the blade at the front of the studs, in conjunction with centrifugal force, holds the scraping edge of the blade in close contact with the wall of the freezing chamber and in substantially tangential relation therewith. The blade is preferably made of thin, non-corrosible material, such as stainless steel, and is sufficiently flexible longitudinally and transversely to permit it to be easily mounted on or removed from the mutator. This flexibility of the blade and the fact that it is mounted for radial and tangential movement relative to the rotatable mutator body enables it to conform readily to variations in the chamber wall due to expansion and contraction and to irregularities in the wall due to other causes. The blade is held primarily by the material in the chamber in close contact with the wall during the operation of the mutator to scrape the wall and prevent the material from building up thereon. The blade can be readily dismounted from the studs for any purpose and especially for cleaning, and this is facilitated because of the absence of movable parts. The capability of the blade for rocking movement prevents the material from clogging and especially when it is composed, in part, of fruits, nuts, and the like, and the freedom of movable parts on the blade and on the mounted studs and the ease with which the blade may be removed and replaced makes it possible to clean the device easily and to keep it clean without a special effort.

To prevent the material from clogging in the passage 40, I provide each mutator with a plurality of agitating fingers 50 which are substantially L-shaped and are rigidly mounted in sockets 51, Fig. 3, to extend parallel with and spaced from the body of the mutator about as far as the scraping blades. To insure rigidity of the fingers, they are engaged with studs 52 on the mutator and are secured to the studs by screws 53.

The invention provides a mutator of simple but novel construction which is efficient and positive in operation and which prevents the material from adhering to the wall of the freezing chamber and enables a constant and uniform flow of the material through the chamber to produce a uniform product. One of the principal features of the invention is the novel manner of mounting the scraper blades on the mutator body so that they will rock under the influence of centrifugal force and the pressure of the material against the underside thereof to force the scraping edges into operative contact with the wall of the freezer to scrape any material from the wall which may adhere thereto. The blade is loosely but securely retained in place and since it is made of flexible material, it will readily adapt itself to changes in the freezer wall due to thermal conditions and to irregularities which may otherwise be present in the wall. The agitator fingers 50 are of special importance when two or more mutators are arranged for operation in connected freezing chambers so that the material will not clog the connection and prevent the flow of material from one chamber to the other. These agitators keep the material in constant condition for continuous flow through the passage which connects one chamber with the other and insures uniform movement of the material.

I have shown and described the invention herein in one form suitable for an ice cream freezer, for which the invention is primarily intended, but it may be desirable to make changes in the form, construction, and arrangement of parts to adapt the invention for different kinds of freezers or for other purposes, and I reserve the right to make all such changes as fall within the scope of the following claims:

I claim:

1. In a mutator adapted to operate in a chamber having a cylindrical enclosing wall, a rotatable body, a row of spaced studs on said body having reduced necks and heads outwardly of said reduced necks, said studs extending substantially radially of said body, a blade of less thickness than the radial extent of said necks and having keyhole openings therein so that said heads may pass through the larger portions of said openings whereby when the blade is longitudinally moved the smaller portions of said openings are disposed about said necks below said heads to retain the blade on the studs in substantially tangential relation with said wall, and means for preventing longitudinal movement of said blade to prevent displacement thereof from said studs.

2. In a mutator adapted to operate in a chamber having a cylindrical enclosing wall, a rotatable body, a row of spaced studs on said body having reduced necks and heads outwardly of said reduced necks, said studs extending substantially radially of said body, a blade of less thickness than the radial extent of said necks and having keyhole openings therein so that said heads may pass through the larger portions of said openings whereby when the blade is longitudinally moved the smaller portions of said openings are disposed about said necks below said heads to retain the blade on the studs in substantially tangential relation with said wall, and another stud on said body mounted in alignment with the row of spaced studs, said blade having an opening therein to receive said other stud to hold said blade against longitudinal movement to prevent displacement of said blade from said studs.

3. In a mutator adapted to operate in a chamber having a cylindrical enclosing wall, a rotatable body, a longitudinally extending scraping blade mounted on the body in spaced relation therewith and adapted for scraping contact with the chamber wall and having one end thereof terminated inwardly of the adjacent end of the body, a plurality of agitating fingers mounted on the body intermediate said end of the blade and the adjacent end of the body and including portions extending substantially parallel with the body, and means interposed between the parallel portions of the agitating fingers and the body to hold said fingers rigidly in position.

4. In a mutator adapted to operate in a chamber having a cylindrical enclosing wall, a rotatable body mounted in said chamber and extended axially thereof, a row of spaced radially extending studs on said body and each including a reduced neck located intermediate the ends thereof, a resilient blade including a scraping edge and having keyhole openings therein adapted to have the reduced portions thereof engaged with the reduced necks on said studs to support said blade with the scraping edge thereof in juxtaposition to said enclosing wall and with said blade extending substantially in tangential relation with said wall, and means for preventing longitudinal movement of said blade to prevent displacement of the reduced portions of said keyhole openings from said studs to thereby retain said blade in the aforesaid relation with said wall.

5. In a mutator adapted to operate in a chamber having a cylindrical enclosing wall, a rotatable body mounted in said chamber and extended axially thereof, a row of spaced radially extending studs on said body and each including a reduced neck located intermediate the ends thereof, a resilient blade including a scraping edge and having keyhole openings therein adapted to have the reduced portions thereof engaged with the reduced necks on said studs to support said blade with the scraping edge thereof in juxtaposition to said enclosing wall and with said blade extending substantially in tangential relation with said wall, and another stud on said body aligned with said row of studs, said blade having an opening therein adapted to engage the other stud to prevent displacement of the reduced portions of said keyhole openings from said studs to thereby retain said blade in the aforesaid relation with said wall.

6. In a mutator adapted to operate in a chamber having a cylindrical enclosing wall, a rotatable body mounted in said chamber and extended axially thereof, a row of spaced radially extending studs on said body and each including a reduced neck intermediate the ends thereof, a blade including a scraping edge and having openings therein located nearer the opposite edge than the scraping edge, the openings in said blade being engaged with the reduced necks on said studs whereby said blade is supported on said studs with the scraping edge thereof in juxtaposition to said enclosing wall and with said blade extending substantially in tangential relation with said wall, said blade being of less thickness than the radial extent of the reduced necks on said studs and the openings in said blade being larger than said reduced necks whereby said blade may move radially of said studs and pivot thereon relative to the tangential relation thereof with said enclosing wall whereby the pressure of material in said chamber on the part of said blade in juxtaposition to said scraping edge holds said edge in operative contact with said chamber wall.

7. A mutator having a cylindrical enclosing wall and comprising a rotatable body, a flat blade having a scraping edge at one side edge thereof and having openings therein positioned intermediate the longitudinal center line between the side edges of the blade and the side edge of the blade opposite the scraping edge, and means on said body for attaching said blade to the body and including parts disposed in said openings, said parts being narrower than the openings and said blade being thinner than the extent of said parts whereby said blade may move radially and tangentially of the body to automatically adjust itself to maintain the scraping edge thereof in contact with the enclosing wall.

ARTHUR H. BOILEAU.